(12) United States Patent
Landström et al.

(10) Patent No.: US 8,737,255 B2
(45) Date of Patent: May 27, 2014

(54) METHODS AND ARRANGEMENTS FOR REDISTRIBUTING RESOURCES FOR USE IN A RADIO COMMUNICATION SYSTEM

(75) Inventors: Sara Landström, Luleà (SE); Per Burström, Luleà (SE); Stefan Wänstedt, Luleà (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 43 days.

(21) Appl. No.: 13/583,136

(22) PCT Filed: Oct. 28, 2010

(86) PCT No.: PCT/SE2010/051170
§ 371 (c)(1),
(2), (4) Date: Sep. 6, 2012

(87) PCT Pub. No.: WO2011/112132
PCT Pub. Date: Sep. 15, 2011

(65) Prior Publication Data
US 2013/0003583 A1    Jan. 3, 2013

(30) Foreign Application Priority Data

Mar. 8, 2010  (WO) ................. PCT/SE2010/050255

(51) Int. Cl.
*G01R 31/08* (2006.01)

(52) U.S. Cl.
USPC ............ 370/252; 370/241; 370/310; 370/251

(58) Field of Classification Search
None
See application file for complete search history.

(56) References Cited

U.S. PATENT DOCUMENTS

| | | | |
|---|---|---|---|
| 7,003,310 B1 | 2/2006 | Youssefmir et al. | |
| 2003/0083088 A1* | 5/2003 | Chang et al. | 455/522 |
| 2008/0310523 A1* | 12/2008 | Hui et al. | 375/260 |
| 2009/0005097 A1* | 1/2009 | Shaffer et al. | 455/517 |
| 2009/0052371 A1 | 2/2009 | Ariyur | |
| 2009/0181708 A1* | 7/2009 | Kim et al. | 455/501 |

OTHER PUBLICATIONS

International Search Report, Application No. PCT/SE2010/051170, Feb. 16, 2011, 4 pp.
Written Opinion of the International Searching Authority, Application No. PCT/SE2010/051170, Feb. 16, 2011, 7 pp.

(Continued)

*Primary Examiner* — Anez Ebrahim
(74) *Attorney, Agent, or Firm* — Myers Bigel Sibley & Sajovec, P.A.

(57) ABSTRACT

A method and an arrangement (500) in a radio network node (130) for redistributing resources between at least a first and second communication device (110, 120) are provided. The radio network node (130) obtains a first estimate of a first signal quality for the first communication device (110) and a second estimate of a second signal quality for the second communication device (120). The radio network node (130) determines a first required signal quality for the first communication device (110) and a second required signal quality for the second communication device (120). When the first required signal quality is less than the first estimate and the second required signal quality is greater than the second estimate, the radio network node (130) allocates resources to the first and second communication devices (110, 120) such that the first signal quality decreases and such that the second signal quality increases.

15 Claims, 7 Drawing Sheets

(56) References Cited

OTHER PUBLICATIONS

International Preliminary Report on Patentability, Application No. PCT/SE2010/051170, Mar. 27, 2012, 14 pp.

Alcatel-Lucent, "Comparison of CSI Feedback Schemes", 3GPP Draft; R1-093343, $3^{rd}$ Generation Partnership Project (3GPP), Mobile Competence Centre; 650, Route des Lucioles; F-06921 Sophia-Antipolis Cedex; France; No. Shenzhen, China, Aug. 24, 2009, XP050388123 [retrieved on Aug. 29, 2009], *sections 2 to 3.3*, 11 pp.

Mitsubishi Electric, "Leakage-based precoding for CoMP in LTE-A", 3GPP Draft; R1-090028, $3^{rd}$ Generation Partnership Project (3GPP), Mobile Competence Centre; 650, Route des Lucioles; F-06921 Sophia-Antipolis Cedex; France; No. Ljubljana, Jan. 7, 2009, XP050317976, [retrieved on Jan. 7, 2009], *sections 2.2, 2.2.1 and 4*, 13 pp.

Motorola, "CoMP Operation Based on Spatial Covariance Feedback and Performance Results of Coordinated SU/MU Beamforming", 3GPP Draft; R1-092634 Comp Operation and Results—Final, $3^{rd}$ Generation Partnership Project (3GPP), Mobile Competence Centre; 650, Route des Lucioles; F-06921 Sophia-Antipolis Cedex; France; No. Los Angeles, USA; Jun. 24, 2009, XP050351125, [retrieved on Jun. 24, 2009], *sections 1 to 4*, 9 pp.

\* cited by examiner

METHODS AND ARRANGEMENTS FOR REDISTRIBUTING RESOURCES FOR USE IN A RADIO COMMUNICATION SYSTEM

CROSS-REFERENCE TO RELATED APPLICATIONS

This application is a 35 U.S.C. §371 national stage application of PCT International Application No. PCT/SE2010/051170, filed on 28 Oct. 2010, which itself claims priority to PCT International Application No. PCT/SE2010/050255, filed on 8 Mar. 2010. The disclosures of both of the above referenced applications are hereby incorporated herein in their entireties by reference. The above-referenced PCT International Application No, PCT/SE2010/051170 was published in the English language as International Publication No, WO 2011/112132 on 15 Sep. 2011.

TECHNICAL FIELD

The present disclosure relates generally to wireless communication and to a method and an arrangement in a telecommunication system. In particular, the present disclosure relates to a method and an arrangement in a radio network node for redistributing resources between a first and a second communication device.

BACKGROUND

The use of data transmission in wireless networks is increasing rapidly. One effect of new transmission technologies and operator business models is that data transmission capacity can be seen as a commodity. The increase in consumption is not only related to increasing bandwidth requirements but also verbose application design and the large number of users. Each generation of telecommunication technology has enabled higher data rates and lower delays which are important for the user experience. With the next emerging generation of telecommunication technology, Long Term Evolution (LTE), new challenges aiming at even more efficient use of radio resources have to be overcome in order to satisfy the demand for efficient data transmissions.

The Uplink (UL) transmission in a wireless LTE network relates to transmission of user data from a User Equipment (UE) to a Base Station (BS) of a wireless communication cell. The Base Station may commonly be referred to as an evolved Node B (eNB). The UL transmission in an LTE enabled cell is typically administered by dividing the UL into a plurality of Resource Blocks (RBs). As illustrated in FIG. 1, two resource blocks (RBs) defines in the time domain one sub-frame, having a typical duration of 1 ms, whereas in the frequency domain one resource block typically comprise 12 sub-carriers. The technology used for UL transmission, in LTE, is Single Carrier FDMA. Consequently, if two RBs are assigned to a UE in the same subframe they must be consecutive in the frequency domain. The resource block of FIG. 1 may also be used for downlink transmission where the transmissions to a UE may be distributed in frequency, using frequency diversity schemes as is know in the art.

FIG. 5 is a signaling scenario illustrating a typical procedure for a UE requiring resources for data transmission. UE 100 having data to send requests UL resources by transmitting a Scheduling Request (SR) to an eNB 110, as indicated with a first step 1:1. The eNB 110 responds to such a request by performing resource scheduling, as indicated with a next step 1:2, wherein it assigns UL resources, i.e. one or several RBs, to UE 100, and decides on an appropriate UL transport format for the assigned UL resources. The transport format could comprise parameters defining e.g. Transport Block (TB) size, physical layer coding and multiplexing. Thereby, eNB 110 will be aware of the UL transmission format to be applied for the data transmission before the data is received. The parameters specified for the allocated radio resources are issued by eNB 110 and transmitted to UE 100 in a Schedule Grant (SG), as indicated with a subsequent step 1:3. By analyzing the received SG, UE 100 can find out the transport format and the RBs it has been allocated by eNB 110 and, on the basis of this information UE 100 can initiate the requested UL transmission to eNB 110, as indicated with a final step 1:4.

Scheduling of UL resources to UEs is a complex problem where numerous factors and parameters may have to be accounted for. One parameter to take into consideration could be the amount of data, presently stored in its respective send buffer that the UE has to send. The UE sends Buffer Status Reports (BSR) to the scheduler in the eNB, which uses these reports to prioritize and allocate resources between different UEs. A BSR may typically comprise information regarding the buffer sizes for corresponding logical channels.

FIG. 8 shows another signaling scheme, describing in general manner, the steps to be taken when data becomes available for transmission at a UE 100 and if this data belongs to a radio bearer (logical channel) group having a higher priority than those for which data already exists in the buffer, or if the UE 100 buffer was empty just before this new data became available for transmission, as indicated with a step 1:1. The UE 100 transmits a SR to the eNB in order to acquire UL resources, as indicated with another step 1:2. In response to the request of step 1:2, eNB 130 schedules RBs, as indicated with another step 1:3, and responds by transmitting a SG to the UE 100, as indicated with a subsequent step 1:4, after which UE 100 may initiate data and BSR transmissions in the UL, as indicated in a final step 1:5.

With this type of triggering mechanism, the eNB 130 can quickly be made aware when data with higher priority is available for transmission at UE 100, without having to request any excessive reporting from UE 100. The trigger of a regular BSR also triggers an SR. Another type of BSR, typically referred to as the periodic BSR, provides a timer-based trigger per UE, enabling reporting for continuous flows.

Different Transport Block (TB) sizes are available for data transmission. In case a TB size is larger than the amount of data available for transmission at the time of assembly of the Media Access Control (MAC) Protocol Data Unit (PDU) to be used for the transmission, one BSR, commonly referred to as a padding BSR, can also be included.

In order to increase throughput in a wireless cell, certain transmission schemes are currently employed. One commonly used scheme suitable for increasing the data rate between a UE and the eNB is Single User Multiple Input Multiple Output (SU-MIMO), which is a scheme utilizing at least two concurrent data streams for data transmission between a UE and the eNB. Applying this scheme increases the data rate between the UE and the eNB. However, this scheme relies on the fact that the send buffer of the UE is sufficiently large to bring satisfying gains.

LTE supports Multiple User (MU)-MIMO in the uplink (UL) and the downlink (DL). MU-MIMO schemes are configured to support multiple UEs sending simultaneously to an eNB by utilizing spatial multiplexing of the UEs. Even though this will cause intra-cell interference, the interference can be limited if the UEs are carefully selected. By defining a sufficiently high channel quality, commonly referred to as Signal-to-Interference-plus-Noise-Ratio (SINR) for a UE, there is a possibility to identify UEs feasible to be involved in MU-MIMO. The selection of two, or in some cases, even more UEs for which MU-MIMO is to be applied may further be based on various factors such as spatial correlation of reference signals or sounding reference signals received from different UEs to acquire information of channel quality and spatial position of the UEs. In the uplink, the eNB measures the UL channel quality through sounding and demodulation reference symbols and thereby estimates the SINR.

Hence, MU-MIMO performance is generally affected by parameters such as e.g. SINR distribution, scheduling priorities and channel estimation. Current MU-MIMO schemes are designed to optimize with a focus on the most demanding UEs, i.e. UEs with high data rate services. Further, in order not to diminish each UE's level of data per RB, two UEs with high SINR are preferred.

Consequently, in order to increase the cell's efficiency by employing MU-MIMO, many UEs with high respective SINRs are required to be able to identify a number of UEs which are suitable for co-sending on the same RBs. If the respective SINR is not high enough, utilization of MU-MIMO may be less efficient than SU-MIMO for the UEs since the UEs amount of data per RB usually decreases. This implies that the highest throughput gains are accomplished when UEs with both high buffer data rates and high SINR are employed in MU-MIMO.

Coordinated Multi-Point (CoMP) transmission and reception refers to a system where the transmission and/or reception at multiple, geographically separated antenna sites are dynamically coordinated in order to improve system performance. The coordination can either be distributed, by means of direct communication between the different sites, or centralized in a central coordinating node. In some scenarios, the antenna sites may be Radio Remote Units controlled by one single radio network node, such as an eNB.

CoMP is considered for International Mobile Telecommunications Advanced (IMT-Advanced) as a potential technique to improve the coverage for high data rate users, to improve the cell-edge throughput and/or to increase system throughput. In particular, the goal is to distribute the user perceived performance more evenly in the network by taking control of the inter-cell interference.

Downlink coordinated multi-point transmission implies dynamic coordination among multiple geographically separated transmission points, and may be categorized as follows. Coordinated scheduling and/or beamforming may be applied in situations where data to a single UE is instantaneously transmitted from one of the transmission points, and scheduling decisions are coordinated to control, e.g. the interference generated in a set of coordinated cells. Joint processing/transmission may be applied in situations where data to a single UE is simultaneously transmitted from multiple transmission points, e.g. to improve the received signal quality and/or actively cancel interference for other UEs. Moreover, uplink coordinated multi-point reception implies joint reception and processing of signals at multiple, geographically separated points. Scheduling decisions may be coordinated among cells to control interference.

In systems employing CoMP in the uplink, similar dynamic coordination among multiple transmission points as described above is required. For example, such coordination may be performed by exchange of interference covariance matrices.

Most CoMP technologies try to optimize the system settings for a full buffer scenario where all users can utilize their signal quality, such as SINR. In other scenarios, the buffers may not be full. Consider for example a typical low data rate service such as speech. When sent over an IP network it is called VoIP (Voice over IP). VoIP has a low data rate, but stringent delay requirements such that data must be sent periodically. For the AMR codec with a 12 kbps bit rate and 20 ms periodicity a typical VoIP packet is between 320-400 bits. When the user is listening, less information is sent in special packets called SID packets, which are approximately 120-150 bits. In addition to VoIP, gaming and certain M2M applications generate small packets. Furthermore, many background messages generated by PC applications are small and not bundled together. Thus, it is common to also send small packets, i.e. the buffers may not be full.

Therefore, a problem of prior art is that it is required that the UEs in the system require high data rates in order to fully make use of the schemes proposed for increased throughput.

US2009052371 discloses a method for distributed power control in a network. The method determines a transmit power for a plurality of transmitting nodes such that signals sent from each of the transmitting nodes are received at a receiving node at a signal to interference plus noise ratio (SINR) set point. The method includes increase and decrease of SINR such that an average SINR is maintained. An SINR for transmitting nodes having a data rate higher than an average data rate, is increased.

SUMMARY

An object is to improve resource utilization in a radio communication system.

According to an aspect, the object may be achieved by a method in a radio network node for redistributing resources between a first and a second communication device. The radio network node obtains a first estimate of a first signal quality for the first communication device and a second estimate of a second signal quality for the second communication device. The radio network node determines a first required signal quality for the first communication device and a second required signal quality for the second communication device. When the first required signal quality is less than the first estimate and the second required signal quality is greater than the second estimate, the radio network node allocates resources to the first and second communication devices such that the first signal quality decreases and such that the second signal quality increases. In this manner, resources are redistributed between the first and second communication devices.

According to another aspect, the object may be achieved by an arrangement in a radio network node for redistributing resources between at least a first and a second communication device. The arrangement comprises a processing circuit configured to obtain a first estimate of a first signal quality for the first communication device and a second estimate of a second signal quality for the second communication device. The processing circuit is further configured to determine a first required signal quality and a second required signal quality. Furthermore, the processing circuit is configured to allocate resources to the first and second communication devices such that the first signal quality decreases and such that the second signal quality increases, when the first required signal quality is less than the first estimate and the second required signal quality is greater than the second estimate. In this manner, resources between the first and second communication devices are redistributed.

The first communication device is not fully exploiting its available signal quality, i.e. the first estimate is greater than the first required signal quality. The second communication device is limited by its available signal quality, i.e. the second estimate is less than the second required signal quality. Thus, the second communication device would benefit from having a greater signal quality available for exploitation. Then, the radio network node allocates the resources such that the signal quality of the first communication device is allowed to decrease and such that the signal quality of the second communication device is allowed to increase (at the expense of the decreased signal quality for the first communication device). As a result, the above mentioned object is achieved.

Advantageously, it is herein disclosed a method and an arrangement which provides means for redistributing resources more efficiently among at least the first and second communication devices.

Signal quality may be Signal-to-Interference-and-Noise-Ratio (SINR), Signal-to-Leakage-and-Noise-Ratio (SINR), Channel Quality Indicator (CQI) or the like. Expressed differently, the signal quality may be a signal quality value associated to the relation of a signal strength to the interference and/or noise strength of said signal.

The resources may, as an example, relate to transmit power as determined by precoder selection or the like, selection of resource blocks for transmission, selection of sub-frames for transmission, modulation scheme, transport format, transport block size and the like.

The first communication device may be a radio communication device, such as a cellular phone or a personal digital assistant, a personal computer, a laptop or the like, with radio communication capabilities. Furthermore, the term "communication device" is broader than the term "User Equipment", which may be used herein as an example of a communication device. This is also applicable to the second communication device.

Further features of, and advantages of, the present solution will become apparent when studying the appended claims and the following description. It is to be understood that different features of embodiments herein may be combined to create embodiments other than those described in the following, without departing from the scope of the present solution.

BRIEF DESCRIPTION OF THE DRAWINGS

The various aspects of embodiments of the present invention, including its particular features and advantages, will be readily understood from the following detailed description and the accompanying drawings, in which.

DETAILED DESCRIPTION

Figure 1:
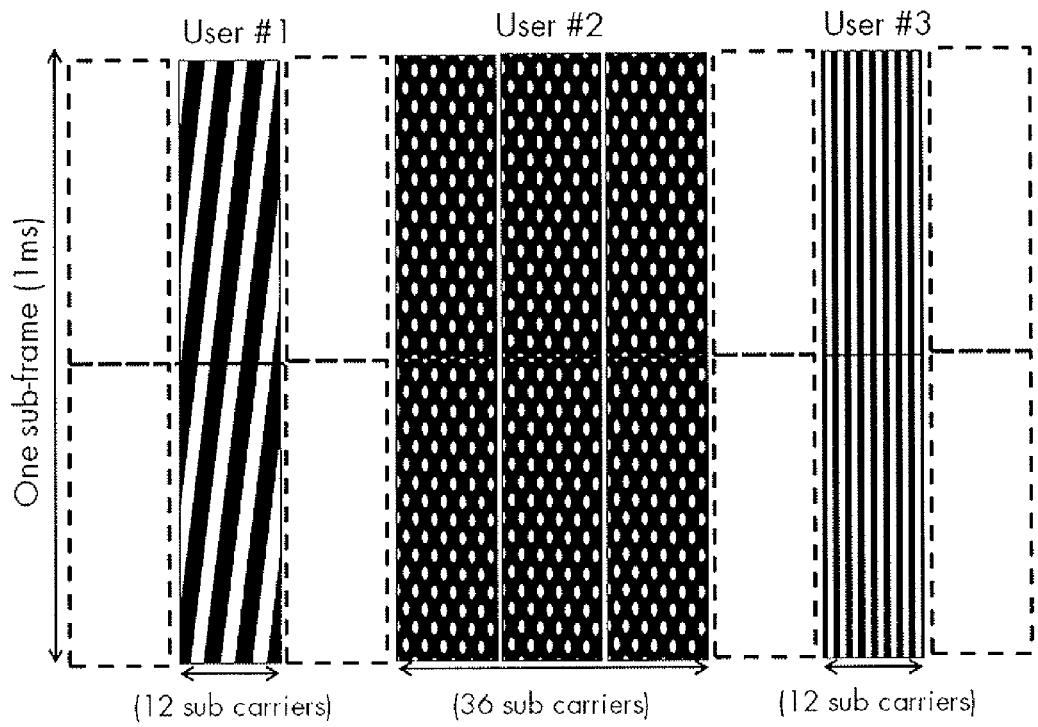
FIG. 1 is a schematic overview of the arrangement of two resource blocks in a time/frequency spectrum.

Background art has traditionally focused on MIMO schemes for high data rate UEs to increase the throughput between BS and UEs. Instead of focusing on scheduling improvements for UEs with high data rate requirements as in prior art, some embodiments herein focuses on resource allocation UEs for efficient MU-MIMO in the UL or DL. However, this may be particularly useful in cases where there exists low data rate UEs with a signal quality which is above a level needed for emptying its send buffer in one allocation of RBs, i.e. the first estimate is greater than the first required signal quality.

Throughout the following description similar reference numerals have been used to denote similar nodes, elements, parts, items or features, when applicable.

Figure 2:
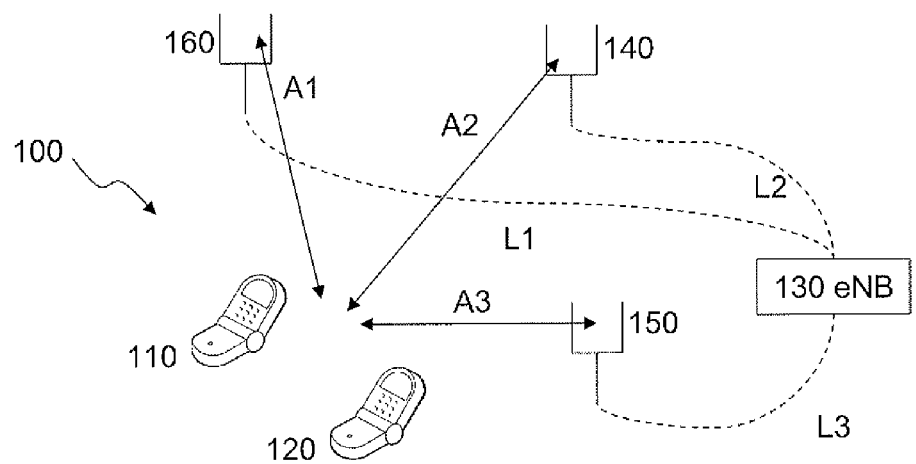
FIG. 2 shows a schematic overview of an exemplifying radio communication system in which the present solution may be implemented.

In FIG. 2, there is shown an exemplifying radio communication system 100, in which the present solution may be implemented. The radio communication system 100 comprises a radio network node 130, such as an evolved-NodeB when the radio communication system 100 is an LTE system. Furthermore, the radio communication system 100 comprises a first communication device 110 and a second communication device 120. At least one of the first and second communication devices 110, 120 may be served by the radio network node 130. It may here be noted that the present solution may be extended to cases where there are three or more communication devices as well. A first, a second and a third arrow A1, A2, A3, denote a respective transmission between a first, a second and a third antenna (or antenna arrangement) 140, 150, 160 and the first and second communication devices 110, 120. The radio network node 130 controls the first, second and third antennas, which may be radio remote units or antennas of one or more radio network nodes (not shown) via links L1, L2 and L3, respectively. Each of the links L1, L2 and L3 may be realized by a wireless connection, such as a radio communication connection, by a fiber connection or the like. As an example, line L1 may be a radio communication connection and line L2 may be a fiber connection. A mix of radio remote units and antennas of other radio network nodes (again not shown) may also be realizable. Thus, the present solution may be applied to systems employing inter-site CoMP, intra-site CoMP or a combination thereof.

Figure 3:
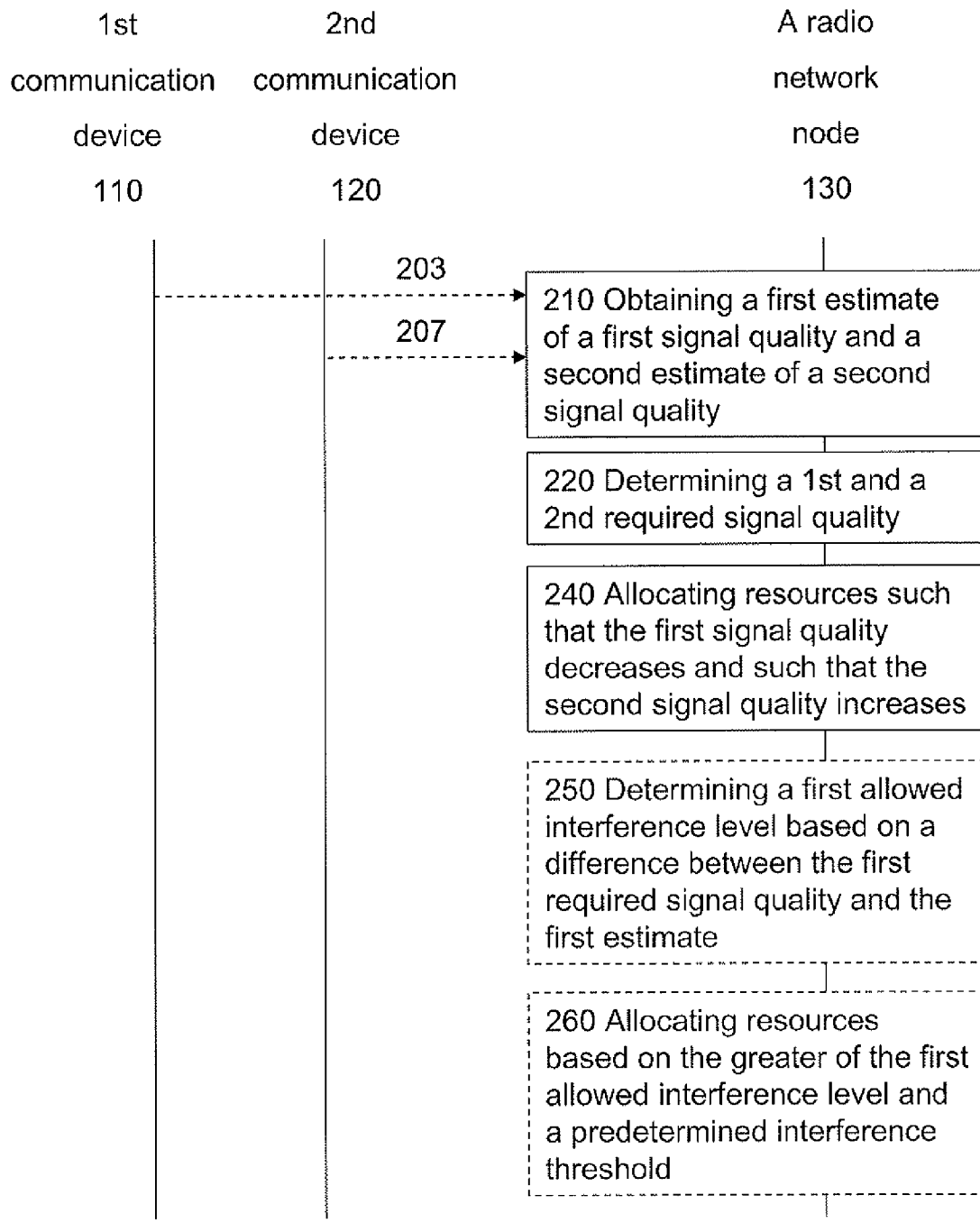
FIG. 3 shows a schematic, combined signalling and flow chart of a method performed in the radio communication system of FIG. 2, FIGS. 4A and 4B show examples for illustrating how selection of different antenna weights affect the transmission beam.

FIG. 3 shows a schematic, combined signalling and flow chart of a method, performed in the radio communication system of FIG. 2, for redistributing resources between a first and a second communication device 110, 120. The following steps may be performed.

210 The radio network node 130 obtains a first estimate of a first signal quality for the first communication device 110 and a second estimate of a second signal quality for the second communication device 120.

220 The radio network node 130 determines a first required signal quality for the first communication device 110 and a second required signal quality for the second communication device 120.

240 When the first required signal quality is less than the first estimate and the second required signal quality is greater than the second estimate, the radio network node 130 allocates resources to the first and second communication devices 110, 120 such that the first signal quality decreases and such that the second signal quality increases, thereby redistributing resources between the first and second communication devices 110, 120.

In some embodiments as indicated by dashed lines in the Figure, a step 250 may be performed as described below.

Advantageously, redistribution of resources may lead to improved performance if the second communication device 120 has a lot of data to send, i.e. the second communication device 120 would send at a higher data rate if its signal quality, such as SINR, SLNR, CQI or the like, was increased. The first communication device 110, which does not need (or use) its current signal quality, because it has not enough data to send, gets a decreased signal quality. Signal quality may also be redistributed to prioritize between the first and second communication devices 110, 120.

In some embodiments, a first and a second revised signal quality are estimated based on conditions specified by a resource allocation decision. The conditions may include, but are not limited to, resource blocks, precoder, transmit power, transmission subframe and more. In such case, the resource allocation decision may be configured such that the first revised signal quality for the first communication device is less than or equal to the first estimate and the second revised signal quality for the second communication device is greater than or equal to the second estimate. It may here be noted that, in some embodiments, a first initial resource allocation decision may be an arbitrary or skilled guess (or an estimate) in order to iteratively find a suitable resource allocation decision which fulfils a criterion for the first and second revised signal quality indicated above. In other embodiments, a resource allocation decision is made and no further iterations are performed.

In some embodiments of the method, the radio network node 130 further allocates the resources such that the first signal quality is above or at the first required signal quality. In this manner, the signal quality for the second communication device 120 may be improved without decreasing the data rate for the first communication device 110.

In some embodiments of the method, the first and/or the second communication device 110, 120 may be served by the radio network node 130. In an exemplifying scenario, where Radio Remote Units (RRU) are employed, both the first and second communication devices 110, 120 are served by the radio network node 130. In another exemplifying scenario, where the radio network node 130 coordinates transmission/reception from at least one further radio network node in addition to its own transmission/reception, it may be the case that the first communication device 110 is served by the radio network node 130 and the second communication device 120 is served by said further radio network node.

In some embodiments of the method, such as when implemented in a downlink broadcasting scenario, the first and second required signal qualities are based on size of a common data buffer associated to the first and second communication device 110, 120, wherein the first and second required signal qualities are great enough to allow the first and second communication device 110, 120 to empty the common data buffer in one allocation. In an exemplifying (downlink) broadcasting scenario, performance may be improved by increasing signal quality to the communication device which is limiting a data rate of a broadcasting stream (sometimes referred to as layer). The broadcasting stream is transmitted to at least the first and second communication devices 110, 120. Therefore, it is desired to allocate resources such that the least of the first and second signal quality is increased as much as possible. Hence, the present inventors have realized that the teachings herein may be applied t broadcasting scenarios in addition to CoMP scenarios.

In some embodiments of the method, the first required signal quality is great enough to allow the first communication device 110 to empty a first data buffer, associated to the first communication device 110, in one allocation, and the second required signal quality is great enough to allow the second communication device 120 to empty a second data buffer, associated to the second communication device 120, in one allocation. In an exemplifying scenario where at least one of the first and second communication devices 110, 120 are data-limited, resources may be allocated based on respective buffer size and required signal quality. As a result, throughput and delay may be reduced.

In some embodiments of the method, the radio network node 130 further allocates the first and second communication devices 110, 120 to at least one common resource block. In more detail, the data of the data buffers of the first and second communication devices 110, 120 have been allocated to the same resource block, i.e. said at least one common resource block. Expressed differently, at least one resource block has been allocated to both the first and second communication devices 110, 120. In detail, by means of spatially multiplexing data of the first and second communication devices 110, 120, the first and second communication devices 110, 120 may be allocated to the same resource block. This embodiment and other similar embodiments are further elaborated below in sections describing pairing and scheduling in conjunction with FIGS. 6A and 6B. Advantageously, uplink and/or downlink performance for a MU-MIMO scenario is improved.

In some embodiments of the method, a first difference between the first estimate and the first required signal quality is greater than a first predetermined threshold value and/or a second difference between the second estimate and the second required signal quality is greater than a second predetermined threshold value. Hence, only when the difference between the first and second estimates and the required first and second signal qualities are great enough according to the first and second predetermined thresholds, the first and/or second communication device may be considered for pairing. Therefore, the number of communication devices that may be considered for pairing is reduced. An advantage is, hence, that processing time and/or power for determining pairing is reduced. Notably, the first and second predetermined threshold values are related to thresholds for signal quality.

In some embodiments of the method, the first communication device 110 has a first scheduling priority above a third predetermined threshold value and/or the second communication device 120 has a second scheduling priority above a fourth predetermined threshold value. It may be noted that the third and fourth predetermined threshold values are related to thresholds for scheduling priority. As an example, the scheduling priority may indicate amount of data in data buffer of the respective communication device.

In some embodiments of the method, the radio network node 130 controls transmit power from at least a first antenna arrangement by means of a first set of antenna weights. Furthermore, the radio network node 130 allocates transmit power to said at least a first antenna arrangement according to the first set of antenna weights. The first set of antenna weights is configured such that the first signal quality decreases and such that the second signal quality increases. In more detail, the first antenna arrangement may comprise two or more antenna elements. Furthermore, the radio network node 130 controls transmission power, amplitude and phase of signals from each antenna element of said at least a first antenna arrangement, whereby direction of transmission from said at least a first antenna arrangement may be controlled. For example, transmission power and more may be given by information provided by a respective precoder for the first and second communication devices 110, 120. Advantageously, the radio network node 130 may distribute signal quality by means of beamforming. For example, a radio beam may be tuned (or directed) towards the second communication device 120 to improve signal quality associated thereto. In uplink scenarios, the first and/or second communication device 110, 120 may tune (or direct) its radio beam towards or slightly off the radio network node 130 based on the signal quality as described herein.

In some embodiments of the method, the radio network node 130 further controls (either directly or indirectly via a second radio network node; intra-site) transmit power from a second antenna arrangement by means of a second set of antenna weights. Moreover, the radio network node 130 allocates transmit power to the second antenna arrangement according to the second set of antenna weights, wherein the second set of antenna weights is configured such that the first signal quality decreases and such that the second signal quality increases. In this embodiment, transmission from the first and second antenna arrangement may be coordinated by the radio network node 130. Thus, this may be a scenario in which CoMP is employed. An advantage may be that signal quality is improved as a result of coordinated beamforming.

Figure 4A:
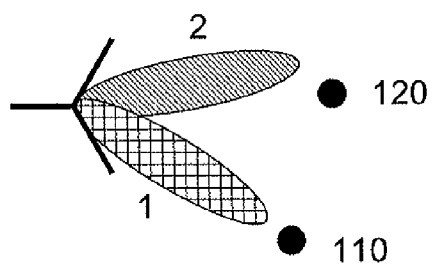
Figure 4B:
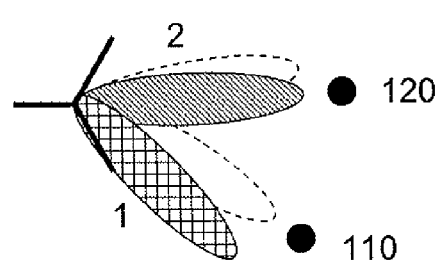
Figure 5:
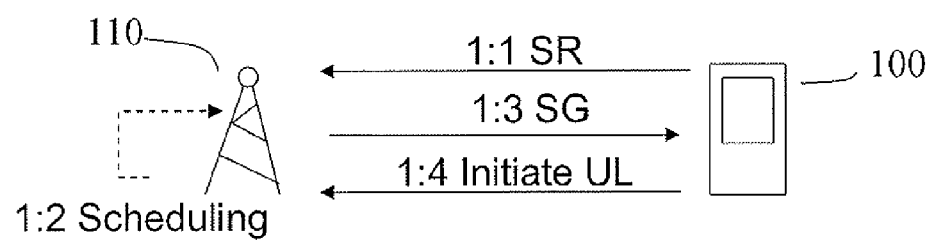
FIG. 5 is a scenario diagram, illustrating a signalling scenario between a UE and an eNB.

Now with reference to FIG. 4A and FIG. 4B, there is shown a first and second example illustrating the radio network node (indicated by a tilted Y) and a first and a second radio transmission beam 1, 2 propagating therefrom. In FIG. 4A, a first selection of antenna weights, for example the first set of antenna weights, is such that the first transmission beam 1 is directed at the first communication device 110. Moreover, the first selection of antenna weights is such that the second transmission beam 2 is directed slightly off the second communication device 120, i.e. the second transmission beam 2 is directed at a point located beside the second communication device 120. In a scenario, where the first communication device 110 is data-limited and the second communication device 120 is signal quality limited, such as SINR-limited, it would be beneficial to apply a second selection of antenna weights (to replace the first selection of antenna weights) as illustrated in FIG. 4B. In FIG. 4B, the second selection of antenna weights is such that the first transmission beam 1 is directed slightly off the first communication device 110, whereby the signal quality for the first communication device will be decreased. Moreover, the second selection of antenna weights is such that the second transmission beam 2 is directed at the second communication device 120, whereby the signal quality for the second communication device 120 will be increased. Hence, resources, in terms of transmit power controlled by antenna weight selection, may be more efficiently distributed between the first and second communication devices 110, 120. The antenna weight selection may, as an example, be determined by a selected precoder.

In some embodiments of the method, the first and second communication devices 110, 120 are comprised in a coherent Coordinated-Multipoint-cluster, "CaMP-cluster", served by the radio network node 130. The following step may be performed.

250 The radio network node 130 determines, for the first communication device 110, a first allowed interference level based on a difference between the first required signal quality and the first estimate.

260 The radio network node 130 allocates resources based on the greater of the first allowed interference level and a predetermined interference threshold. The predetermined threshold is indicative of an amount of allowed interference leakage between the first and second communication devices 110, 120. As mentioned above, the radio network node 130 may have allocated the first and second communication device 130 to a common resource block. When the first allowed interference level is greater than the predetermined threshold, it is a sign of that the first communication device 110 may tolerate more interference than given by the predetermined threshold. Hence, in such situation it is advantageous to use the first allowed interference threshold when determining the set of antenna weights as outlined below.

The predetermined threshold may be a parameter epsilon, which in this context is known from a technology, for determining the set of antenna weights, sometimes referred to as "epsilon forcing". In this manner, epsilon-forcing joint transmission schemes are allowed to distribute the signal quality between the first and second communication devices 110, 120 more efficiently by increasing the flexibility and degrees of freedom in solving the convex problem of setting antenna weights (or antenna transmit weights) by effectively utilizing user-specific Signal-to-Leakage-and-Noise-Ratios. Expressed differently, the first allowed interference level may be redistributed between the first and the second communication device 110, 120 such that the second communication device may interfere more with (or leak more to) the first communication device 110.

The present solution may also be in cases employing zero-forcing joint transmission. Zero-forcing joint transmission is also known in the art.

Notably, in some embodiments of the method, the order of the steps may differ from what is indicated herein. In some embodiments, the step 210 may be performed after the step 220. Moreover, in some embodiments, the step 250 may be performed before the step 240.

In some embodiments of the method, the allocation of resources relates to allocation of data in the uplink. For example, allocation may be performed in conjunction with scheduling of resources. In some embodiments, the first data buffer is a first send buffer of the first communication device 110 and the second data buffer is a second send buffer of the second communication device 120. In case of an uplink scenario, the resources are used to send a signal received by the radio network node 130. Advantageously, performance is improved by means of efficient uplink scheduling.

In some embodiments of the method, the allocation of resources relates to allocation of data in the downlink. For example, allocation may be performed in conjunction with scheduling of resources. The signal may be received from a multitude of transmission points with multiple antennas, such as one or more radio network nodes or radio base stations. In case of a downlink scenario, the resources are used to send a signal received by at least one of the first and second communication devices 110, 120.

In some embodiments of the method, the step of obtaining 210 a first estimated signal quality for the first communication device 110 and a second estimated signal quality for the second communication device 120 may be performed as follows. A step 203 and/or a step 207 may be performed as described below.

203 The radio network node 130 receives from the first communication device 110 information about the first estimated signal quality for the first communication device 110. In embodiments, the information about the first estimated signal quality may comprise a quantized signal, an estimated (or calculated) value of SINR and/or SLNR, a CQI report, a quantized channel, CSI (Channel State Information) feedback or the like.

207 The radio network node 130 receives from the second communication device 120 information about the second estimated signal quality for the second communication device 120. In this embodiment, the first and/or second communication device(s) 110, 120 has/have estimated the information about the estimated signal quality. In more detail, the first and/or second communication device 110, 120 may report a set of precoders for which the signal/channel quality has been estimated.

In some embodiments of the method, the step of obtaining 210 a first estimated signal quality for the first communication device 110 and a second estimated signal quality for the second communication device 120 may comprise estimating the first estimated signal quality for the first communication device 110, and/or estimating the second estimated signal quality for the second communication device 120.

Figure 10:
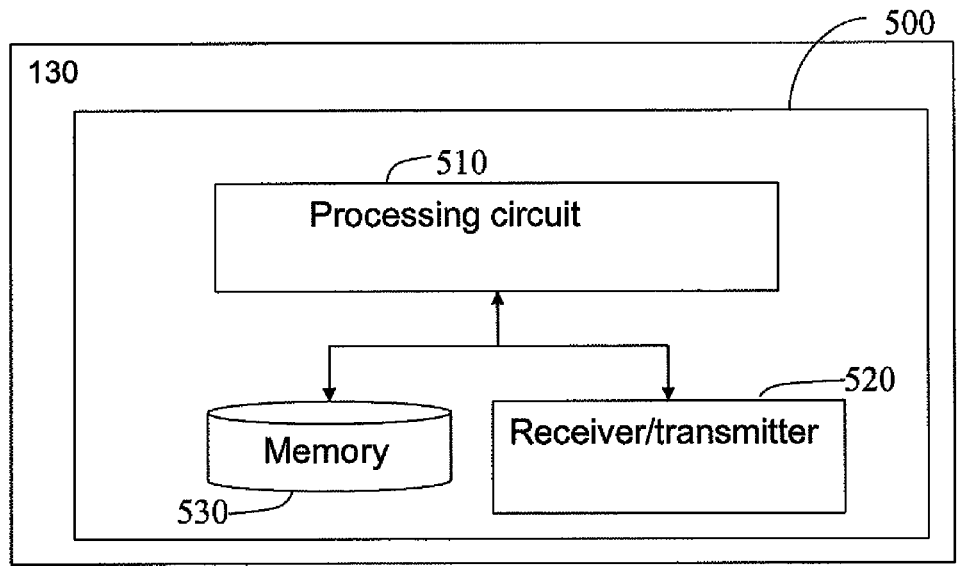
FIG. 10 shows a block diagram, illustrating the architecture of a scheduler according to one exemplary embodiment.

Now referring to FIG. 10, there is shown an arrangement (apparatus or scheduler) 500 in a radio network node 130 for redistributing resources between at least a first and a second communication device 110, 120. The arrangement 500 comprises a processing circuit 510 configured to obtain a first estimate of a first signal quality for the first communication device 110 and a second estimate of a second signal quality for the second communication device 120. The processing circuit 510 is further configured to determine a first required signal quality and a second required signal quality. Furthermore, the processing circuit 510 is configured to allocate resources to the first and second communication devices 110, 120 such that the first signal quality decreases and such that the second signal quality increases, when the first required signal quality is less than the first estimate and the second required signal quality is greater than the second estimate. In this manner, resources between the first and second communication devices 110, 120 are redistributed. The processing circuit 510 may be a processing unit, a processor, an application specific integrated circuit (ASIC), a field-programmable gate array (FPGA) or the like. Moreover, the arrangement 500 may comprise a memory 530 for storing software to be executed by, for example, the processing circuit. The software may comprise instructions to enable the processor to perform the method described above.

In some embodiments of the arrangement 500, the processing circuit 510 is further configured to allocate the resources such that the first signal quality is above or at the first required signal quality.

In some embodiments of the arrangement 500, the first and/or the second communication device 110, 120 are served by the radio network node 130.

In some embodiments of the arrangement 500, the first or second required signal quality is based on a size of a common data buffer associated to the first and second communication devices 110, 120, wherein the first or second required signal quality is great enough to allow the first or second communication device 110, 120 to empty the common data buffer in one allocation.

In some embodiments of the arrangement 500, the first required signal quality is great enough to allow the first communication device 110 to empty a first data buffer, associated to the first communication device 110, in one allocation, and the second required signal quality is great enough to allow the second communication device 120 to empty a second data buffer, associated to the second communication device 120, in one allocation.

In some embodiments of the arrangement 500, the processing circuit 510 is further configured to allocate the first and second communication devices 110, 120 to at least one common resource block.

In some embodiments of the arrangement 500, a first difference between the first estimate and the first required signal quality is greater than a first predetermined threshold value and/or a second difference between the second estimate and the second required signal quality is greater than a second predetermined threshold value.

In some embodiments of the arrangement 500, the first communication device 110 has a scheduling priority above a third predetermined threshold value and/or the second communication device 120 has a scheduling priority above a fourth predetermined threshold value.

In some embodiments of the arrangement 500, the processing circuit 510 is further configured to control transmit power from at least a first antenna arrangement by means of a first set of antenna weights, and to allocate transmit power to said at least a first antenna arrangement according to the first set of antenna weights. The first set of antenna weights is configured such that the first signal quality decreases and such that the second signal quality increases.

In some embodiments of the arrangement 500, the processing circuit 510 is further configured to control transmit power from a second antenna arrangement by means of a second set of antenna weights, and to allocate transmit power to the second antenna arrangement according to the second set of antenna weights, wherein the second set of antenna weights is configured such that the first signal quality decreases and such that the second signal quality increases.

In some embodiments of the arrangement 500, the first and second communication devices 110, 120 are comprised in a coherent Coordinated-Multipoint-cluster served by the radio network node 130, Furthermore, the processing circuit 510 is configured to determine, for the first communication device 110, a first allowed interference level based on a difference between the first required signal quality and the first estimate. Moreover the processing circuit 510 is further configured to allocate 260 resources based on the greater of the first allowed interference level and a predetermined interference threshold, wherein the predetermined threshold is indicative of an amount of allowed interference leakage between the first and second communication devices 110, 120.

In some embodiments of the arrangement 500, the processing circuit 510 is further configured to allocate resources for sending data in the uplink.

In some embodiments of the arrangement 500, the processing circuit 510 is further configured to allocate resources for sending data in the downlink.

In some embodiments of the arrangement 500, the processing circuit 510 is further configured to receive 203 from the first communication device 110 information about the first estimated signal quality for the first communication device 110, and/or to receive 207 from the second communication device 120 information about the second estimated signal quality for the second communication device 120.

In some embodiments of the arrangement 500, the processing circuit 510 is further configured to estimate the first estimated signal quality for the first communication device 110, and/or to estimate the second estimated signal quality for the second communication device 120.

In the following, a detailed description of an exemplary method and an exemplary device for obtaining effective scheduling and pairing of UEs in the UL of a wireless communication cell is provided. The exemplary method and device employ the concept of allocating the first and second communication device on to a common resource block as described above according to an embodiment. In general, the example method and device may be applied to any wireless communication cell provided that MU-MIMO is employed and that signal quality is measurable and a buffer status is obtainable for a UE.

In some embodiments described below, SINRmin corresponds to the first required signal quality or the second required signal quality. The SINRmin indicates an SINR required for emptying said primary UEs send buffer in one allocation. Furthermore, primary UEs and secondary UEs correspond to the first and second communication devices, respectively. The expression "an SINR of a UE pair exceeds the respective primary UEs SINRmin" corresponds to that the first signal quality exceeds the first required signal quality and that the second signal quality exceeds the second required signal quality.

The exemplifications and descriptions in this document relate to a communication network which is based on the emerging LTE and particularly E-UTRAN Air interface in the wireless network cell. It is, however, possible to implement this method and device in any wireless communication cell as described above.

The scheduling and pairing exploits the relation between SINR and buffer transmission requirement to increase ratio between user data and other data such as e.g. BSR-padding or padding containing no user information. In accordance with FIG. 11 for each MCS there is a relationship between number of bits per RB and SINR. This relationship can be utilized in order to efficiently exploit unused or available SINR capacity for a particular UE. One such example may be a UE having transmission requirement of 200 bits per RB but a SINR of 15 dB. 200 bits per RB can be transmitted with QPSK with a SINR of less than 5 dB. Thus, this particular UE can be paired to share an allocation together with another UE. Although the SINR may decrease due to intra-cell interference it is still above the required SINR for sending. It shall be noted that the pairing and scheduling method and device described in conjunction with some embodiments can be applied also to other MSCs and to UEs with other levels of QoS requirements.

A low data rate user, such as a user of the first communication device, can often empty its send buffer in one allocation of RBs with a robust Modulation and Coding Scheme (MCS) given its channel conditions. FIG. 6B shows an example of how a RB can be used for data limited users. This example illustrates only one RB, however the present solution is also suitable for scenarios where a plurality of RBs is allocated. In this example, however, the payload part transports user data as well as a BSR. If the TB size is larger than the user data 301 available for transmission at the time of assembly of the MAC PDU for transmission, a BSR 302 will typically be included. This process is generally known as BSR padding. Thus, for a low data rate user, only a part of the transmission capacity of a RB 300 will be used for actually transporting user data 301. In such a scenario where a RB still has available capacity when user data 301 and a BSR 302 is included for transmission, additional padding 303 containing no information will typically be added. Padding 303 containing no information may be sub-optimal if another user with data in its send buffer exists in the cell. In some embodiments, link adaptation may be applied to match the data rate needed for the low data rate user. In this manner, padding and retransmission may be reduced.

Figure 11:
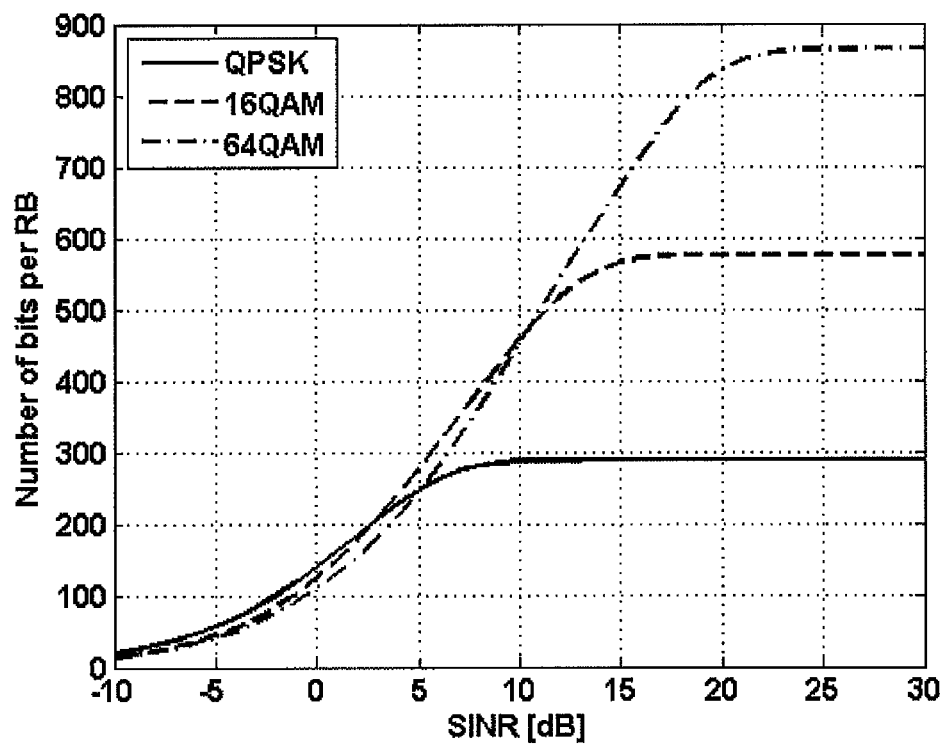
FIG. 11 shows a diagram, illustrating the relation between transmission rate and SINR-levels for different transport block coding.

As further illustrated in the simulation results of FIG. 11, a UE which can be considered as a low data rate user will typically be able to empty its send buffer on one allocation with QPSK modulation and a relatively low SINR. And moreover, such UE's TB will typically carry BSR padding to fill up transmission capacity not utilized for user data.

Figure 6A:
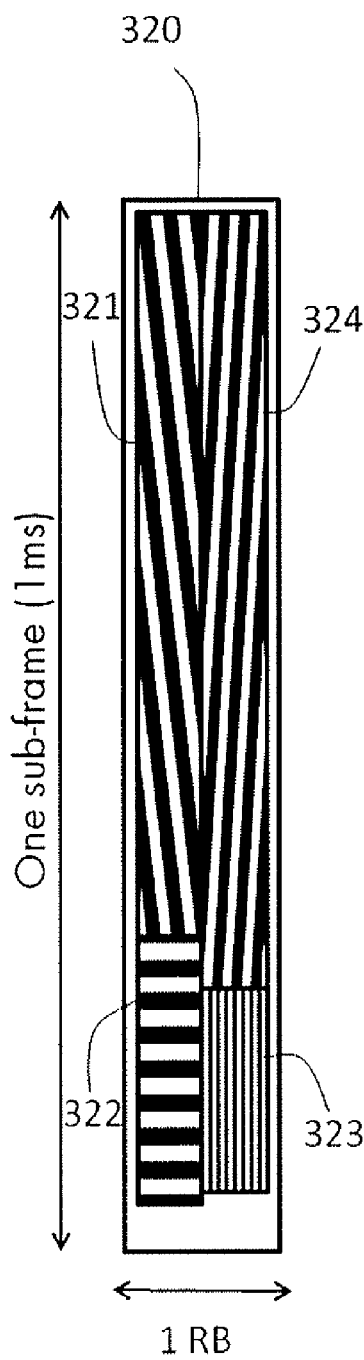
FIGS. 6A and 6B show a schematic overview, illustrating a RB of two co-sending UEs.
Figure 6B:
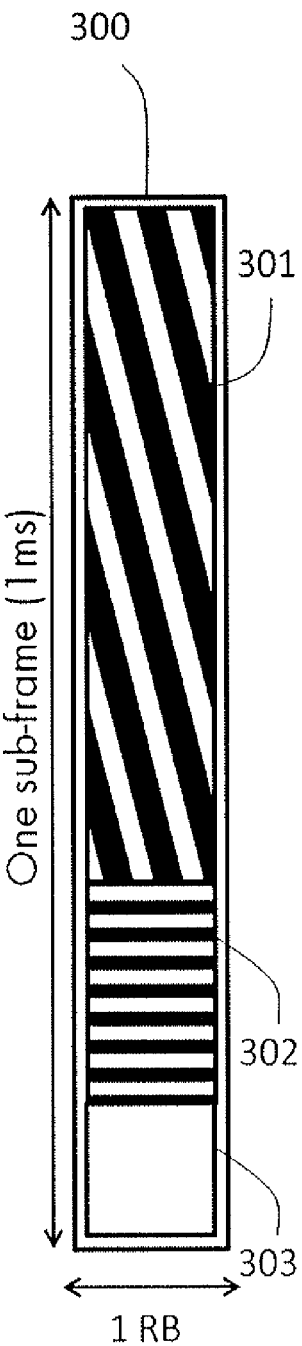

An alternative way of making use of the RBs in a more efficient way is illustrated in FIG. 6A. which shows a RB 320 where resources which have been allocated to two UEs, such as e.g. two UEs instantiated similarly to the example in FIG. 6B, have been paired and scheduled such that the user data (321, 324) associated with the paired UEs are co-sent in the same sub-frames and RB 320. Spatial multiplexing generally decreases the SINR for a particular RB due to intra-cell interference. Thus, the user data typically requires more bits per UE as more robust modulation and coding may be required when co-sending in the same RB compared to what is required when the user data is sent in two separate RBs. For clarity, this exemplary embodiment shows only one RB assigned for a primary UE as well as the resource requirement of a secondary UE and for co-sending in the same RB. It may, however, be noted that in a typical scenario a plurality of RBs may be assigned in a corresponding way to a primary and secondary UE.

Figure 7:
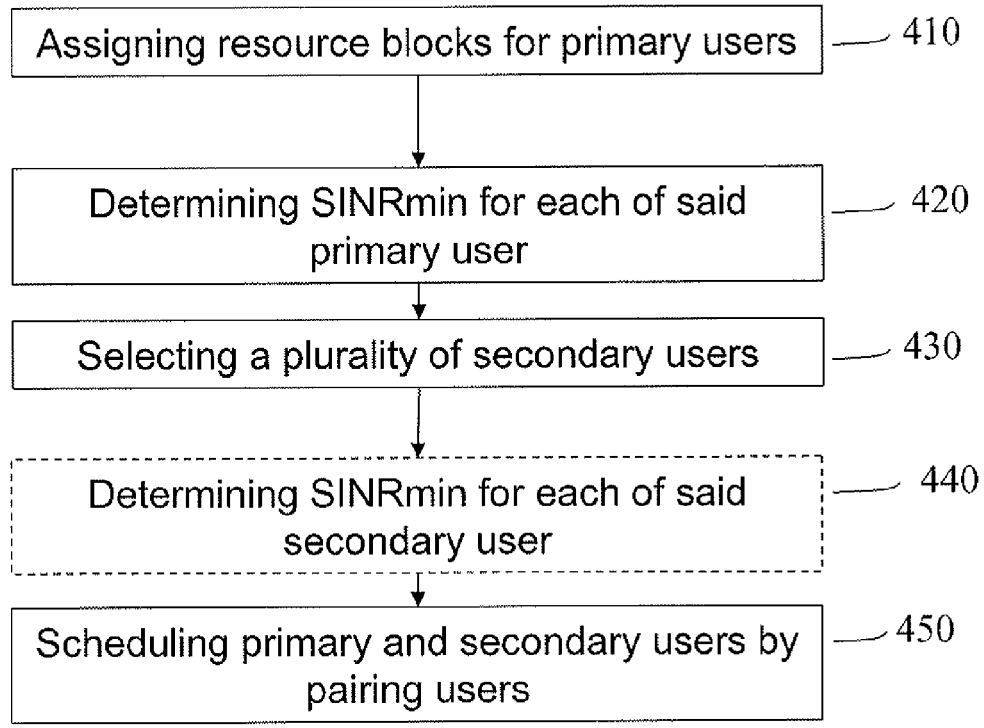
FIG. 7 shows a flow chart, illustrating the operation of an eNB adapted to schedule according to an embodiment of the method.
Figure 8:
FIG. 8 is a scenario diagram, illustrating a triggered signalling scenario between an UE and an eNB.

Thus, pairing two UEs in a manner may enable a first UE, from here on called a primary UE, to empty its send buffer using the same or a more robust MSC as if the UE would not be involved in MU-MIMO. This may be particularly useful for low data rate UEs, i.e. UE with low user data generation, with a low SINR. Thus, FIG. 7 shows one exemplary method for scheduling users by pairing them on the same RB.

In a first step 410 a plurality of UEs, referred to as primary UEs, having data to send are assigned RBs. The SINR required for a primary UE to empty its send buffer, given the RB assignment for the respective primary UE, from hereinafter referred to as the SINRmin, is determined for each primary UE for which RBs have been assigned, as indicated with a next step 420. In accordance with FIG. 7, this step is typically performed to enable a scheduler to realize the difference between the SINRmin for a UE and the estimated SINR. The difference is from the perspective of the scheduling unused and could be exploited for sharing of RBs. In a subsequent step 430, a plurality of secondary UEs is selected from the remaining UEs having data to send in the UL. Different selection criterion may be applied for selecting suitable candidates as secondary UEs, some of which will be described in further detail below. In another step 440, a SINRmin may according to some embodiments be determined also for each of the selected secondary UEs, typically to enable more efficient ways to further delimit the set of secondary UEs which are to be exposed for pairing.

The secondary and primary UEs are to be considered as mutually exclusive sets of UEs which are being exposed to a selected pairing algorithm, as indicated in a final step 450. Primary and secondary UEs are therefore paired and scheduled according to predefined rules, in order to enable UL resources to be shared in an effective manner such that for paired UEs, the SINR for the shared RBs exceeds the SINRmin of a respective paired primary UE.

In an alternative embodiment the step of pairing primary and secondary UEs may comprise the steps of determining that the SINR for the shared RBs exceeds SINRmin for both the paired users, i.e. for both the primary and the secondary UE. Thus, not only the primary UE, but also the secondary UE, is allowed to empty its respective send buffer in the same shared allocation.

According to yet another alternative embodiment, the scheduling in step 450 may be executed in a conditional manner, such that, if the SINR for the shared allocated RBs exceeds the SINRmin for a primary UE but not the corresponding SINRmin for a secondary UE, pairing and scheduling can be done such that the secondary UE receives a new allocation, resulting in a possible addition of RBs, and thus the steps in 440 and 450 is repeated until a predetermined condition such as e.g. threshold value is met or for a predefined maximum of iterations per UE pair. The SINR for a shared RB can typically be investigated by modeling the intra-cell interference that occurs between two UEs transmitting via the same RB. These embodiments are typically applied to ensure that a secondary UE of a pair also is able to empty its send buffer in one allocation.

The process of distributing UL resources to UEs is typically a continuously, ongoing and iterative process. When an eNB is allocating UL resources, the eNB needs to specify a MCS which satisfies a number of requirements in order to maximize throughput. Only when those parameters have been determined the SINR threshold for those allocated UL resources can be determined. This is generally done by the scheduler in the eNB determining a most robust MCS where the data rate times a number of allocated RBs is above the amount of data in the UE transmission buffer. The result from this process is from hereinafter referred to as MCStb. For data limited users, only one RB will typically be allocated. A processing unit of the scheduler then determines the SINRmin required for the MCStb to achieve a Block Error Rate (BLER) which is satisfying a predetermined target value, the BLER target.

One way of finding UEs suitable for multiplexing is to traverse through all scheduled UEs and to test all possible pairs. Therefore a measurable indicator is practical in selecting UEs for multiplexing in accordance with the flow chart of FIG. 7. Hence, in a subsequent step, the interrogation unit may, according to some embodiments, determine a relative SINR (SINRrel) i.e. to determine if the relative discrepancy between SINRmin and SINR is large enough to consider this user for MU-MIMO. The SINR values which are in logarithmic scale can be subtracted to get a relative relation (1) or they can be transformed to linear units and then divided (2). SINRrel can typically be used to determine UEs preferable for pairing creating more feasible selection algorithms.

$$SINRrel = SINR - SINRmin \quad (1)$$

$$SINRrel = \frac{10 \times \log_{10}(10^{SINR/10})}{-10^{SINRmin/10}} \quad (2)$$

The operations for determining the relative SINR can, however, also be performed according other alternative ways. The formulas (1) and (2) are merely to be seen as examples and the further specifications are outside the scope of this document. Thus, any way for performing these operations, known to the person skilled in the art, are applicable.

Figure 9:
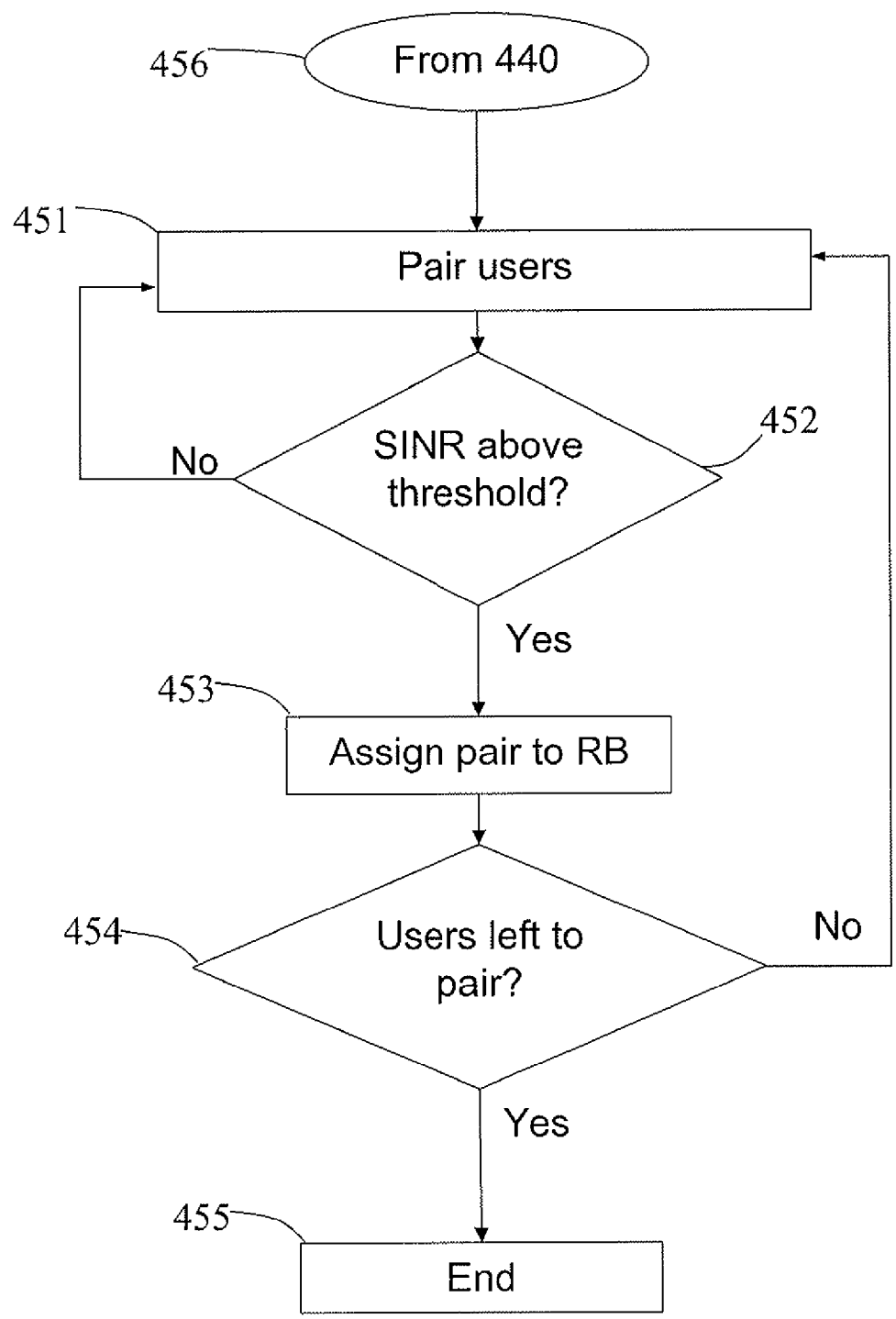
FIG. 9 shows a flow chart, illustrating the pairing of two UEs for co-sending on a RB.

FIG. 9 is a flow chart illustrating the sub-procedures in scheduling paired primary and secondary UEs, i.e. a more detailed description of step 450, according to one exemplifying embodiment. FIG. 9 aims to clarify which steps of procedure 450 that are conditional and where any iterative process may occur. In a first step 451 of FIG. 9, primary and secondary UEs are paired, such that they are assigned the same RB/s. The assigning procedure is executed such that UEs are paired if the SINR for the UEs is above at least the primary UE's predetermined SINRmin. As indicated above also the secondary UEs SINRmin may be taken into consideration, at this step. This is illustrated with conditional step 452. In some embodiments, a step of reallocating the secondary UEs in order to either lower the secondary UE's respective SINRmin through allocating more RBs or reducing intra-cell interference to the secondary UE is performed.

The SINR-level of a RB typically becomes lower due to increased intra-cell interference. Still the primary UE is able to empty its respective buffered UE data in one and the same allocation which the pair is being assigned to, as indicated with a next step 453. A result from the pairing is that further increased spectrum efficiency has been obtained by letting two UEs, typically two low data UEs, share RBs without affecting the primary UE's throughput. This procedure is typically repeated until all selected primary or secondary UEs have been subject to pairing, as indicated with conditional step 454.

According to one exemplary embodiment a primary UE is paired with a secondary UE if the conditions in step 450 are satisfied. Thus, a primary UE will only be subject to pairing until a suitable secondary UE has been identified. In yet another exemplifying embodiment a portion of, or all, primary UEs are traversed and paired. The assigning of pairs of primary and secondary UEs to the same RBs is done such that the communication cell is optimized according to a specific metric, such as e.g. on the basis of the amount of UE data bits to be transmitted.

The step 430 of selecting secondary UEs can be executed according to a plurality of different embodiments, where according to one embodiment, only UEs mutually exclusive with the primary UEs and with sufficiently high scheduling priority are considered as secondary UEs. This method may be efficient to limit, according to a predefined scheduling rule, the number of secondary UEs to be considered and consequently selected for pairing.

In order to enable a more stable system, previously paired primary and secondary UEs may be employed for repetitive pairing for a defined time period. If such selection scheme is employed and based on the primary and secondary UEs respective long-term channel characteristics, there is high probability for a UE pair to be suitable for pairing in a subsequent pairing. Such selection scheme, considering previous pairs, may not only provide a more stable system but also decrease the computational load for determining the UE pairs.

Thus, in some embodiments the paired primary and secondary UEs may instead be stored in a memory for subsequent scheduling iterations. In a subsequent iteration, the secondary UEs may be selected based on information retrieved from the memory which comprises previous paired primary and secondary UEs.

The suggested embodiments of selecting secondary UEs may potentially demand less computation resources but may on the other hand provide substantially increased spectrum efficiency. The described embodiments of selecting secondary UEs may be especially suitable for low data rate UEs and further also for UEs running applications which are generating periodical data for transmission. A scenario for which these conditions may typically be very relevant is when a plurality of UEs is involved in running Voice over Internet Protocol (VoIP) applications/services. This type of applications and services typically minimizes the required bandwidth use by utilizing silence compression with silence descriptors or keep-alive-messages, which may be periodical. Also the VoIP frames containing speech are periodical. By applying the suggested method to UEs having applications with the described transmission behaviors, UL resources may be utilized more efficiently. However, this suggested alternative embodiment could also be useful for UEs with other streaming applications implemented in UDP or TCP protocols. Typically, TCP acknowledgements are small also for high data rate applications and generates a low data rate in the reverse direction of the data. Many applications further generate keep-a-live messages at a low rate to maintain state or check for updates. Low data rate applications can generally be considered to be the applications where one or a few RBs are enough for the UE to empty its respective transmission buffer if scheduled regularly when requested by a SR.

Another embodiment for selecting secondary UEs 430 from a plurality of UEs is based on the UE properties. If such an embodiment is applied, secondary UEs may be selected before pairing e.g. on the basis of their respective channel quality. More specifically on the difference between SINRmin for a specific number of allocated RBs and the current SINR, may e.g. be considered as a selection criterion. The applied selection criterion may then be used as a predetermined threshold value defining a threshold for the difference between the SINR and SINRmin. Such a solution may increase the chance of finding suitable pairs even more, while limiting the number of potential pairs.

In some embodiments, an apparatus for scheduling UEs in a wireless communication cell may be configured according to the simplified block scheme of FIG. 10. More specifically, the figure illustrates a scheduler 500 for scheduling UEs, in the UL, according to one embodiment. The scheduler 500 comprises a processing unit 510 which is configured to assign an allocation of RBs to a selected number of UEs, referred to as primary UEs. The assignment will typically be performed on a basis of criterion such as e.g. scheduling priority, amount of user data in send buffer and channel quality for each respective primary UE. The processing unit 510 is further configured to enable scheduling of the primary UEs by instructing an interrogation unit 511 to determine for each primary UE a SINRmin required to empty the user data contained in its respective send buffer in one allocation of assigned RBs. The SINRmin can be determined either by calculation operations or by look-up operations. In addition, the processing unit 510 is configured to store the result of the described calculations in a memory unit 530 of the scheduler 500.

The processing unit 510 is further arranged to select a plurality of secondary UEs, and may in some embodiments instruct the interrogation unit 511 to determine the SINRmin which is typically stored in the memory unit 530. The processing unit 510 is further configured to pair and assign a primary and secondary UE to the same RB/s, where an assignment of RB/s is executed such that the SINR of a respective pair exceeds the respective SINRmin of the primary UEs of a respective UE pair, wherein the processing unit 510 is configured to execute such a pairing procedure by instructing the interrogation unit 511 to determine the respective SINR values and execute the required comparison steps. The processing unit 510 is also connected to a conventional communication unit 520, which enables the processing unit 510 of scheduler 500 to communicate the result of the assignment by means of SGs to the primary and secondary UEs, in a conventional manner.

In some embodiments, a solution comprising pairs satisfying both the primary and secondary UEs SINRmin might be sought for some applications, where both primary and secondary UEs are allowed to empty their send buffer in a shared allocation of RBs. The processing unit 510 is then further configured to also take secondary UEs SINRmin into account. The pairing process of primary and secondary UEs will then typically be executed such that the processing unit 510 pairs a primary and secondary UE, by instructing the interrogation unit 511 to determine the UEs SINR for a shared allocation and to execute the required comparison steps such that a pair of primary and secondary UEs respective SINRmin is less than the SINR for the shared allocation.

If the processing unit 510 is arranged such that both the primary and the secondary UEs SINRmin is to be applied, the processing unit 510 may be further configured to apply adaptive steps for deciding or re-deciding the secondary UEs allocation. In an alternative embodiment of the scheduler 500, the processing unit 510 schedules a plurality of allocations for the selected secondary UEs and instructs the interrogation unit 511 to determine SINRmin for each allocation, respectively. The allocations with respective SINRmin are stored in the memory unit 530. The processing unit may execute the pairing process such that, if possible, an allocation for a secondary UE is scheduled with a respective SINRmin less than SINR for the RBs shared between a primary and the secondary UE.

In some cases the conditions and properties, such as e.g. signal quality and UE application data generation, of UEs are substantially stable from a first scheduling iteration to a second scheduling iteration. Thus, a pair of a primary and secondary UE satisfying a SINRmin at a first scheduling iteration may have greater possibility to be suitable as a pair for sharing the same allocation of RBs in a second scheduling iteration compared to a random pair of a primary and a secondary UE. Therefore, pairs of primary and secondary UEs previously stored at a memory unit 530 may be reused. The processing unit 510 may in a subsequent scheduling iteration base the selection of secondary UEs and/or pairing of primary and secondary UEs on previously stored pairs obtained from the memory unit 530. Some applications generate user data with a certain periodicity. More specifically, the applications may even generate a certain type of data with a certain periodicity, such as e.g. VoIP applications sending silence descriptors or voice frames. For such cases the processing unit 510 may be further arranged to take this periodicity into account when pairing primary and secondary UEs. More specifically, certain UEs, available as primary and/or secondary UEs, may be more suitable for pairing in a certain periodicity.

If a wireless communication cell comprises a large number of UEs, the process of finding suitable secondary UEs and pairing thereof with primary UEs may be very resource consuming. Consequently, in another embodiment the processing unit 510 could be further arranged to select secondary UEs in alternative manners. In one alternative embodiment, the processing unit 510 may be configured to select secondary UEs having a scheduling priority above a predefined threshold value for pairing. Such an arrangement may delimit the set of secondary UEs exposed for the pairing algorithm.

In another alternative embodiment, the processing unit 510 may instead be configured to select secondary UEs on the basis of the difference between a respective SINRmin and a respective SINR obtained via channel estimation. This arrangement may increase the possibility to find suitable pairs of primary and secondary UEs, and specifically only expose secondary UEs to the selection algorithm if increased intracell interference can be tolerated with regard to the secondary UEs SINRmin. The processing unit 510 may thus be configured to select secondary UEs by instructing the interrogation unit 511 to determine the difference between the CQI indicated SINR and the SINRmin. If the determined difference is above a predefined threshold value specified for a secondary UE the processing unit 510 is configured to select that secondary UE for pairing.

While embodiments of the present solution have been described with reference to specific exemplary embodiments, the description is in general only intended to illustrate how the solution may be used and should not be taken as limiting the scope of the solution. Although the concepts of LTE have been used throughout when describing the above embodiments, any other similar or equivalent standards and network elements for wireless communication may basically be used in the manner described. The solution is generally defined by the following independent claims.

Even though exemplifying embodiments have been described, many different alterations, modifications and the like thereof will become apparent for those skilled in the art. The described embodiments are therefore not intended to limit the scope of the present disclosure.

The invention claimed is:

1. A method in a radio network node for redistributing resources between at least a first and a second communication device, the method comprising:
   obtaining a first estimate of a first signal quality for the first communication device and a second estimate of a second signal quality for the second communication device;
   determining a first required signal quality for the first communication device and a second required signal quality for the second communication device; and
   in response to the first required signal quality being less than the first estimate and the second required signal quality being greater than the second estimate, allocating resources to the first and second communication devices such that the first signal quality decreases and such that the second signal quality increases to redistribute resources between the first and second communication devices, wherein the allocation of resources further comprises allocating the resources such that the first signal quality becomes above or at the first required signal quality,
   wherein the first and second required signal quality is determined based on a size of a common data buffer associated to the first and second communication devices,
   wherein the first and second required signal quality is great enough to allow the first and second communication device to empty the common data buffer in one allocation, or the first required signal quality is great enough to allow the first communication device to empty a first data buffer, associated to the first communication device, in one allocation, and the second required signal quality is great enough to allow the second communication device to empty a second data buffer, associated to the second communication device, in one allocation.

2. The method according to claim 1, wherein the first and/or the second communication device are served by the radio network node.

3. The method according to claim 1, wherein the allocation of resources further comprises:
   allocating the first and second communication devices to at least one common resource block.

4. The method according to claim 1, wherein a first difference between the first estimate and the first required signal quality is greater than a first predetermined threshold value and/or a second difference between the second estimate and the second required signal quality is greater than a second predetermined threshold value.

5. The method according to claim 1, wherein the first communication device has a scheduling priority above a third predetermined threshold value and/or the second communication device has a scheduling priority above a fourth predetermined threshold value.

6. The method according to claim 1, wherein the radio network node controls transmit power from at least a first antenna arrangement by controlling a first set of antenna weights, and the allocation of resources further comprises:
   allocating transmit power to said at least a first antenna arrangement according to the first set of antenna weights, wherein the first set of antenna weights is controlled so that that the first signal quality decreases and the second signal quality increases.

7. The method according to claim 6, wherein the radio network node further controls transmit power from a second antenna arrangement by laeing a second set of antenna weights, and the allocation of resources further comprises:
   allocating transmit power to the second antenna arrangement according to the second set of antenna weights, wherein the second set of antenna weights is controlled so that that the first signal quality decreases and the second signal quality increases.

8. The method according to claim 1, wherein the first and second communication devices are comprised in a coherent Coordinated-Multipoint-cluster served by the radio network node, the method further comprising:
   determining, for the first communication device, a first allowed interference level based on a difference between the first required signal quality and the first estimate, wherein the allocation of resources further comprises:
   allocating resources based on the greater of the first allowed interference level and a predetermined interference threshold, wherein the predetermined threshold is indicative of an amount of allowed interference leakage between the first and second communication devices.

9. The method according to claim 1, wherein the allocation of resources relates to allocation of data in the uplink.

10. The method according to claim 1, wherein the allocation of resources relates to allocation of data in the downlink.

11. The method according to claim 1, wherein obtaining a first estimated signal quality for the first communication device and a second estimated signal quality for the second communication device further comprises:
    receiving from the first communication device information about the first estimated signal quality for the first communication device; and/or
    receiving from the second communication device information about the second estimated signal quality for the second communication device.

12. The method according to claim 1, wherein obtaining a first estimated signal quality for the first communication device and a second estimated signal quality for the second communication device further comprises:
    estimating the first estimated signal quality for the first communication device; and/or
    estimating the second estimated signal quality for the second communication device.

13. An arrangement in a radio network node for redistributing resources between at least a first and a second communication device, wherein the arrangement comprises:
    a processing circuit configured to obtain a first estimate of a first signal quality for the first communication device and a second estimate of a second signal quality for the second communication device, wherein
    the processing circuit further is configured to determine a first required signal quality and a second required signal quality, and wherein
    in response to the first required signal quality being less than the first estimate and the second required signal quality being greater than the second estimate, the processing circuit further is configured to allocate resources to the first and second communication devices such that the first signal quality decreases and such that the second signal quality increases, whereby resources between the first and second communication devices are redistributed, wherein the processing circuit is further configured to allocate the resources such that the first signal quality becomes above or at the first required signal quality, wherein the first and second required signal quality is determined based on a size of a common data buffer associated to the first and second communication devices wherein the first and second required signal quality is great enough to allow the first and second communication device to empty the common data buffer in one allocation, or the first required signal quality is great enough to allow the first communication device to empty a first data buffer, associated to the first communication device, in one allocation, and the second required signal quality is great enough to allow the second communication device to empty a second data buffer, associated to the second communication device, in one allocation.

14. The arrangement according to claim 13, wherein the first and second communication devices are comprised in a coherent Coordinated-Multipoint-cluster served by the radio network node, and the processing circuit is configured to:
   determine, for the first communication device, a first allowed interference level based on a difference between the first required signal quality and the first estimate, wherein the allocation of resources further comprises:
   allocating resources based on the greater of the first allowed interference level and a predetermined interference threshold, wherein the predetermined threshold is indicative of an amount of allowed interference leakage between the first and second communication devices.

15. The arrangement according to claim 13, wherein obtaining a first estimated signal quality for the first communication device and a second estimated signal quality for the second communication device further comprises:
   receiving from the first communication device information about the first estimated signal quality for the first communication device; and/or
   receiving from the second communication device information about the second estimated signal quality for the second communication device.

* * * * *

UNITED STATES PATENT AND TRADEMARK OFFICE
CERTIFICATE OF CORRECTION

PATENT NO. : 8,737,255 B2  
APPLICATION NO. : 13/583136  
DATED : May 27, 2014  
INVENTOR(S) : Landström et al.

Page 1 of 1

It is certified that error appears in the above-identified patent and that said Letters Patent is hereby corrected as shown below:

IN THE SPECIFICATION:

In Column 5, Line 15, delete "Signal-to-Leakage-and-Noise-Ratio (SINR)," and insert -- Signal-to-Leakage-and-Noise-Ratio (SLNR), --, therefor.

In Column 9, Line 61, delete ""CaMP-cluster"," and insert -- "CoMP-cluster", --, therefor.

IN THE CLAIMS:

In Column 20, Line 6, in Claim 6, delete "so that that" and insert -- so that --, therefor.

In Column 20, Line 10, in Claim 7, delete "by laeing" and insert -- by --, therefor.

In Column 20, Line 15, in Claim 7, delete "so that that" and insert -- so that --, therefor.

Signed and Sealed this  
Eighteenth Day of November, 2014

Michelle K. Lee  
*Deputy Director of the United States Patent and Trademark Office*